United States Patent
Sorensen et al.

(10) Patent No.: US 7,421,726 B1
(45) Date of Patent: Sep. 2, 2008

(54) METHOD OF SEAMLESSLY REPLACING DISC-BASED VIDEO STREAMS WITH MEMORY-BASED VIDEO STREAMS IN A VIDEO-ON-DEMAND SYSTEM

(75) Inventors: Craig William Sorensen, Sandy, UT (US); Robert Louis Jacobs, Sandy, UT (US)

(73) Assignee: Unisys Corporation, Blue Bell, PA (US)

( * ) Notice: Subject to any disclaimer, the term of this patent is extended or adjusted under 35 U.S.C. 154(b) by 1341 days.

(21) Appl. No.: 10/108,669

(22) Filed: Mar. 27, 2002

(51) Int. Cl.
*H04N 7/173* (2006.01)
*G06F 13/00* (2006.01)

(52) U.S. Cl. .............. 725/94; 725/93; 725/95; 725/96; 725/115; 711/138

(58) Field of Classification Search .......... 725/86–97, 725/114–115; 709/215, 234, 203; 711/100, 711/152, 163, 138
See application file for complete search history.

(56) References Cited

U.S. PATENT DOCUMENTS

| | | | | |
|---|---|---|---|---|
| 5,583,561 A * | 12/1996 | Baker et al. | .......... | 725/93 |
| 5,809,239 A * | 9/1998 | Dan et al. | .......... | 709/203 |
| 5,815,662 A * | 9/1998 | Ong | .......... | 725/92 |
| 5,892,915 A * | 4/1999 | Duso et al. | .......... | 709/219 |
| 5,928,327 A * | 7/1999 | Wang et al. | .......... | 725/88 |
| 6,115,740 A * | 9/2000 | Mizutani | .......... | 709/217 |
| 2003/0005457 A1* | 1/2003 | Faibish et al. | .......... | 725/94 |

* cited by examiner

*Primary Examiner*—Christopher Grant
*Assistant Examiner*—Chris Parry
(74) *Attorney, Agent, or Firm*—Charles A. Johnson; Robert Marley; Charles J. Fassbender

(57) ABSTRACT

In a video-on-demand system, disc-based video streams are seamlessly replaced with memory-based video streams. This is achieved by first switching each disc-based video stream to a mixed video stream; and later, switching each mixed video stream to a memory-based video stream.

12 Claims, 9 Drawing Sheets

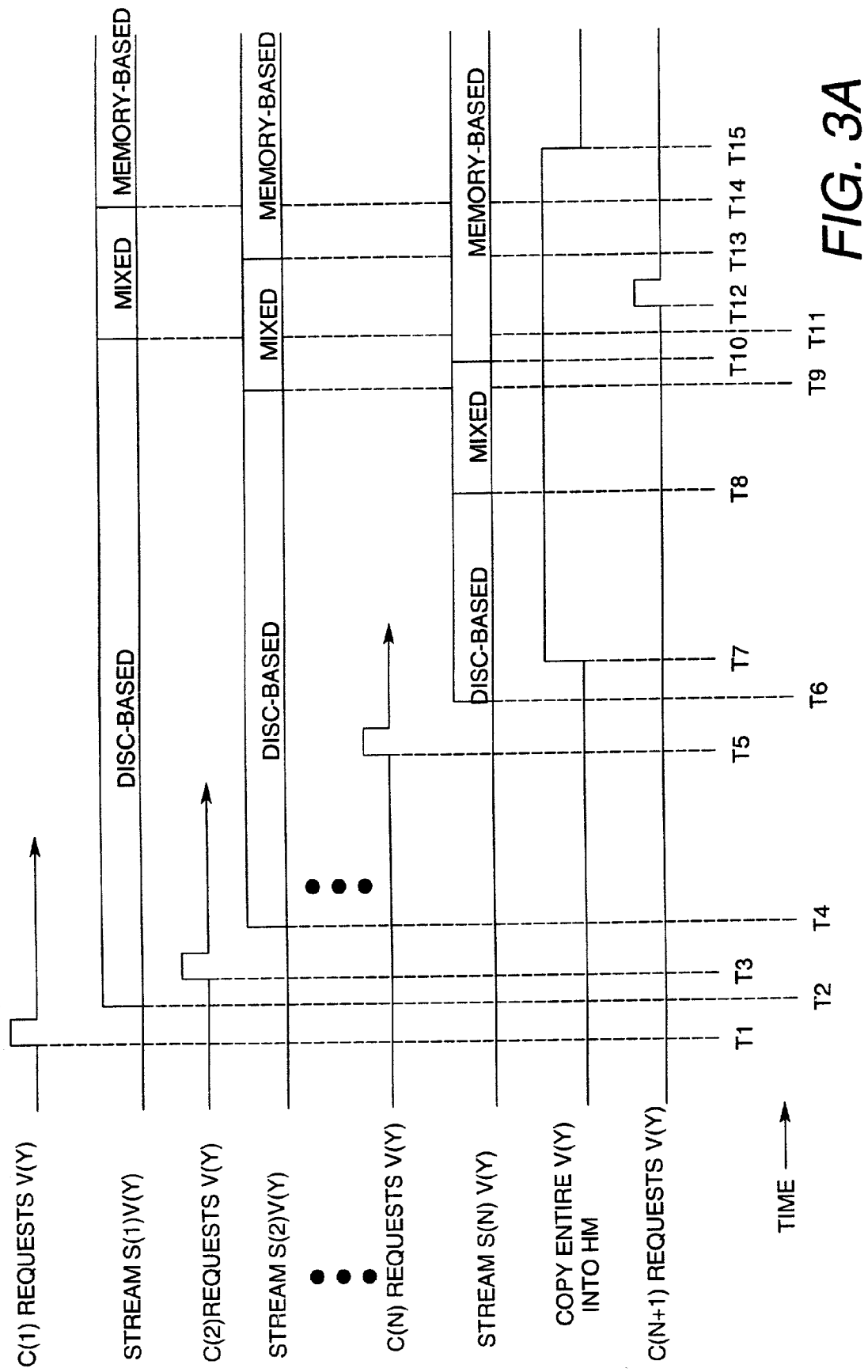

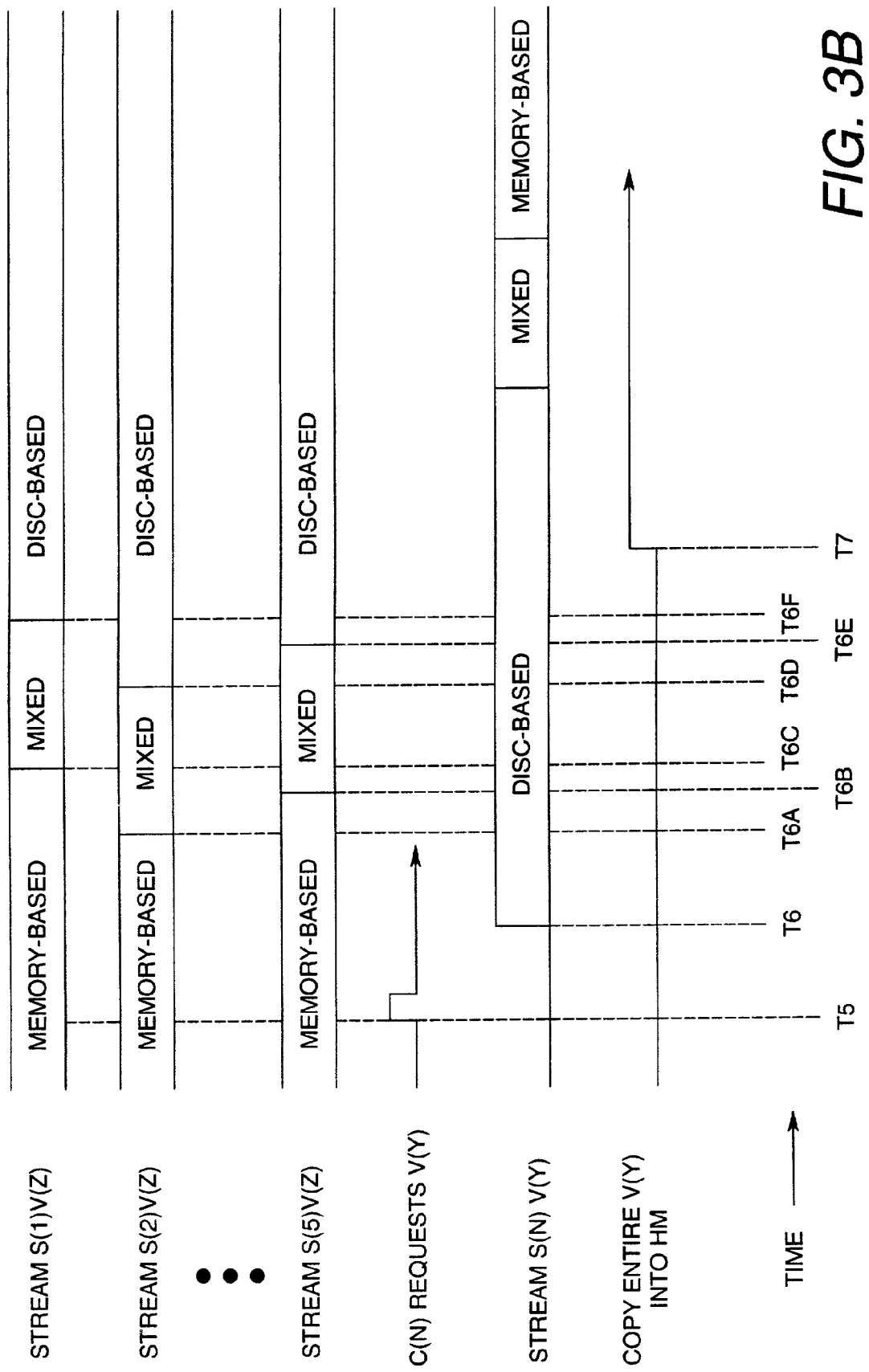

METHOD OF SEAMLESSLY REPLACING DISC-BASED VIDEO STREAMS WITH MEMORY-BASED VIDEO STREAMS IN A VIDEO-ON-DEMAND SYSTEM

RELATED CASES

The present invention, as identified by the above title is related to one other invention which is identified as: entitled "METHOD OF SEAMLESSLY REPLACING MEMORY-BASED VIDEO STREAKS WITH DISC-BASED VIDEO STREAMS IN A VIDEO-ON-DEMAND SYSTEM", having U.S. Ser. No. 10/108,670. Patent applications on these related inventions were filed concurrently on Mar. 27, 2002; and they have one common Detailed Description.

BACKGROUND OF THE INVENTION

This invention relates to video-on-demand systems which send multiple streams of video data to respective viewing devices. In the prior art, one such system is described in U.S. Pat. No. 5,583,561 which is entitled "Multi-Cast Digital Video Server Using Synchronization Groups".

An overview of the above prior art system is shown in FIG. 1 of patent 561. There, several videos are stored in a remote video library 10 which is coupled via a communications channel to a video server 12; and, the video server 12 is coupled through a network interface circuit 18 to a plurality of viewing devices 22, 24, and 26 on a network 20. To receive a particular video at a particular viewing device, a request is sent by a client via a telephone to the video server.

In response to the client's request, the video server 12 retrieves the requested video from the video library 10. Thereafter, the retrieved video is sent as a stream of video data from the video server 12 thru the network interface circuit 18 to the particular viewing device on the network 20 which is for the client who requested to see the video.

One method for passing the stream of video data from the video server 12 thru the network interface circuit 18 is disclosed in detail in the above-referenced patent 561. Also, an alternative method is disclosed in a pending patent application which has Ser. No. 09/318,987 and is entitled "Scaleable Video System Having Shared Control Circuits For Sending Multiple video Streams To Respective Sets Of Viewers". All of the details in the above patent and patent application are herein incorporated by reference.

In the above patent and patent application, the video which is retrieved from the video library can be stored within the video server 12 in a semiconductor memory. Thereafter, each time the video is sent as a stream of video data to a particular viewing device, the source of the stream can be the video in the semiconductor memory. Such a video data stream is herein called a memory-based video stream.

Alternatively, the video which is retrieved from the video library can be stored within the video server 12 on a magnetic disc. Thereafter, each time the video is sent as a stream of video data to a particular viewing device, the source of the stream can be the video on the disc. Such a video stream is herein called a disc-based video stream.

The above memory-based video streams and disc-based video streams are disclosed by a U.S. patent application which is entitled "Video On Demand Video Server Disk/Memory Streaming Selection Methodology", filed on Nov. 16 of 2000, having Ser. No. 09/714,072. In that patent application, the path thru the video server which is followed by each disc-based video stream is described in conjunction with FIG. 2; and the path thru the video server which is followed by each memory-based video stream is described in conjunction with FIG. 3.

However, in the above patent application, no disclosure is made of how to seamlessly replace all disc-based video streams of a particular video with corresponding memory-based video streams. By such a seamless replacement is herein meant that while the video streams are being sent to respective viewing devices, the source of the video is changed from the disc to the semiconductor memory with no interruption, or discontinuity, in the video streams that are sent to the viewing devices.

Likewise, in the above patent application, no disclosure is made of how to seamlessly replace all memory-based video streams of a particular video with corresponding disc-based video streams. By such a seamless replacement is herein meant that while the video streams are being sent to respective viewing devices, the source of the video is changed from the semiconductor memory to the disc with no interruption, or discontinuity, in the video streams that are sent to the viewing devices.

One reason for wanting to replace all disc-based video streams of a particular video with corresponding memory-based video streams can be understood by considering what happens within the video server as the number of disc-based video streams gets larger and larger. As that occurs, the number of times which the video server must read the video from the disc increases; and consequently, the total disc-read workload on the video server increases. Eventually, the disc-read workload can get so large that the video server cannot keep up with all of the disc-based video streams that need to be sent. To reduce the disc-read workload on the video server, all disc-based video streams of a video which has a large number of viewers can be replaced with memory-based video streams.

However, a problem with memory-based video streams is that a large amount of semiconductor memory is needed to store just one complete video, and semiconductor memory is much more expensive than a disc. For example, a typical two hour video takes about three-billion bytes of semiconductor memory storage. Thus, if one or more videos are each being streamed to only a small number viewing devices, then to send those streams as memory-based video streams is not economical.

Accordingly, a primary object of the present invention is to provide a method of seamlessly replacing disc-based video streams with memory-based video streams in a video-on-demand system.

BRIEF SUMMARY OF THE INVENTION

The present invention is a method, which is performed in a video-on-demand system, of seamlessly replacing disc-based video streams with memory-based video streams. To use this method, the video-on-demand system needs to include—1) a digital computer which is coupled to a semiconductor memory, 2) a disc, coupled to the computer, that stores a video, and 3) a network interface circuit which intercouples the computer to respective viewing devices for multiple clients.

Initially, a separate disc-based video stream is sent to the viewing device of each client C(X) who has requested to see a particular video V(Y). In each disc-based video stream, the video is sent in blocks from the disc into a respective buffer for each client in the semiconductor memory; and, from that buffer, the video is sent thru the network interface circuit to the viewing device for the client.

Thereafter, each disc-based video stream is switched to a separate mixed video stream. In each mixed video stream, the video is not sent into the respective buffer for each client in the semiconductor memory. But, the video continues to be sent from the respective buffer thru the network interface circuit to the viewing device for the client.

Later, when the respective buffer in the semiconductor memory empties, the mixed video stream is switched to a separate memory-based video stream. In each memory-based video stream, the video is sent in blocks from a single region in the semiconductor memory, which stores the complete video V(Y), thru the network interface circuit to the viewing device for the client; and, the respective buffers are not even used.

By comparison, if each disc-based video stream is switched immediately to a memory-based video stream, then the last block of video data in each disc-based video stream would only get partially sent thru the network interface circuit to the viewing device for the client before the memory-based video stream starts. But, by first switching each disc-based video stream to a mixed video stream, and later switching each mixed stream to a memory-based video stream, all video data blocks are completely sent in their consecutive order to the viewing device.

BRIEF DESCRIPTION OF THE DRAWINGS

FIG. 3A shows one example of a switching sequence that is performed by the video-on-demand system of FIG. 1 wherein several disc-based video streams are seamlessly replaced with memory-based video streams.

FIG. 3B shows another example of a switching sequence that is performed by the video-on-demand system of FIG. 1 wherein several memory-based video streams are seamlessly replaced with disc-based video streams.

DETAILED DESCRIPTION

Figure 1:
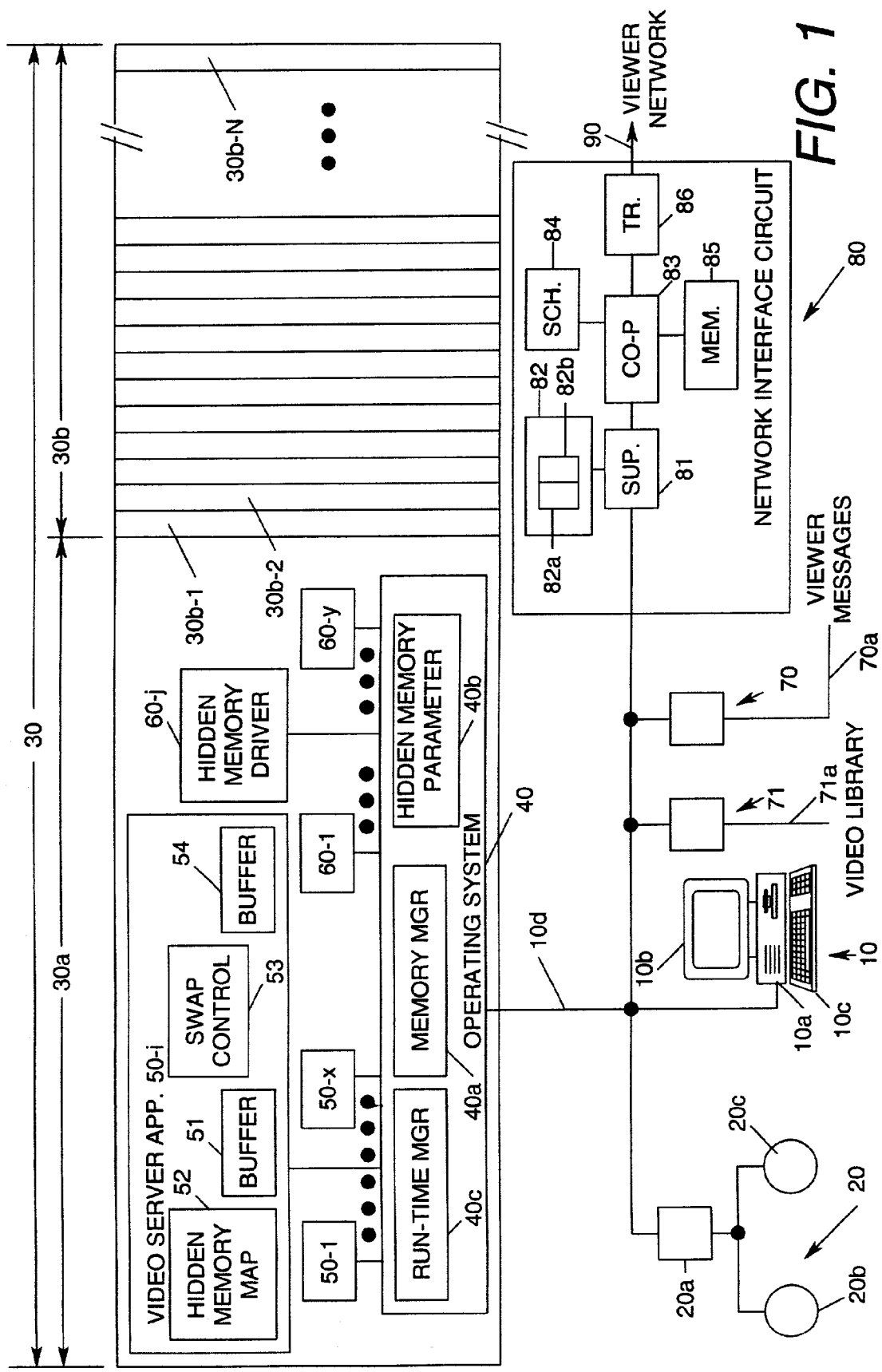
FIG. 1 shows one embodiment of a video-on-demand system which performs the method that is claimed herein as the present invention.

With reference now to FIG. 1, one preferred embodiment of a video-on-demand system will be described which seamlessly replaces disc-based video streams with memory-based video streams, and seamlessly replaces memory-based video streams with disc-based video streams. This FIG. 1 system is comprised of modules 10, 20, 30, 40, 50-1 thru 50-x, 60-1 thru 60-y, 70, 71, 80, and 90. All of these modules are intercoupled to each other as shown, and they are identified below in Table 1.

TABLE 1

Module 10 is a digital computer.
Module 20 is a disc storage module.
Module 30 is a random access semiconductor memory.
Module 40 is an operating system program for the computer 10.

Modules 50-1 thru 50-x are user application programs which run under the control of the operating system program 40. Of particular importance to the present invention is the video server application program 50-i. It includes a swap control subprogram 53 which directs the computer 10 to seamlessly replace disc-based video streams with memory-based video streams, and seamlessly replace memory-based video streams with disc-based video streams. The details of this swap control subprogram 53 are described herein in conjunction with FIGS. 3-9.

Modules 60-1 thru 60-y are input/output driver programs which are called, as needed, by the user application programs.

Module 70 is a communications module which receives control messages, from multiple clients, that select and control videos.

Module 71 is a communications module which retrieves videos, as needed, from a remote video library.

Module 80 is a network interface circuit which couples the computer 10 to a network 90 of respective viewing devices (not shown) for the clients who send the control messages to module 70.

Included in the digital computer 10 is an instruction processor 10a, a visual monitor 10b, a keyboard 10c, and an I/O bus 10d. The instruction processor 10a sequentially executes instructions that are in the programs 40, 50-1 thru 50-x, and 60-1 thru 60-y. In one embodiment, the instruction processor 10a is the Pentium™ instruction processor from Intel Corp.

Included in the disc storage module 20 is a disc controller 20a, a first set of magnetic discs 20b, and a second set of magnetic discs 20c. The discs 20b store one copy of each of the programs 40, 50-1 thru 50-x, and 60-1 thru 60-y; and the discs 20c store one copy of each video that is retrieved from a remote video library by module Y1. These programs and videos are selectively read from and written to the discs in response to commands that are sent to the disc controller 20a over the I/O bus 10d.

Included in the random access semiconductor memory 30 is a multitude of storage cells that are selected by memory addresses. To read or write particular storage cells, commands with accompanying memory addresses are sent to the memory 30 on the I/O bus 10d. These storage cells are made of integrated circuits and can be dynamic storage cells or static storage cells.

The memory 30 is partitioned into two sections 30a and 30b. Section 30a is managed by the operating system program 40 for the computer 10. By comparison, section 30b is hidden from the operating system program 40 and is managed by the video server application program 50-i. A hidden memory parameter 40b is provided in the operating system 40 which indicates the starting address of the hidden memory section 30.

When the FIG. 1 system is initially powered-up, the operating system program 40 is automatically read from the disks 20b into the memory section 30a. Thereafter, the operating system program 40 moves selected user application programs 50-1 thru 50-x, and selected input/output driver programs 60-1 thru 60-y, from the disks 20b into the memory section 30a.

The particular application programs 50-1 thru 50-*x* and driver programs 60-1 thru 60-*y* which are moved into the memory section 30*a* are those which currently need to be run on the computer 10. When the memory section 30*a* gets full, the application programs and driver programs which were least recently used are moved back to the discs 20*b*. To manage this moving operation, a memory manager subprogram 40*a* is included in the operating system program 40.

One particular driver program that is often used by the swap control subprogram 53 is the hidden memory driver 60-*j*. It is called to move a block of video data from a selectable buffer 51 or 54 within the video server application program 50-*i* to a selectable portion 30*b*-1 thru 30*b*-N of the hidden memory 30*b*. Also it is called to move a block of video data from a selectable portion 30*b*-1 thru 30*b*-N of the hidden memory 30*b* to a selectable one of the buffers 51 or 54.

Also included within the operating system program 40 is a run-time manager 40*c* which allocates time slots for running the multiple application programs 50-1 thru 50-*x* and the multiple driver programs 60-1 thru 60-*y* on the digital computer 10. Due to the operation of subprogram 40*c*, the application programs 50-1 thru 50-*x* and driver programs 60-1 thru 60-*y* run on the digital computer 10 in a time-shared manner.

The communications module 70 couples the computer 10 to a communications channel 70*a*. On that channel, module 70 receives control messages from multiple clients which select particular videos, and which include VCR-like commands that control the selected video. Examples of the VCR-like commands are START, STOP, FAST-FORWARD, and REVERSE. Each control message that is received in module 70 is passed onto the I/O bus 10*d* to the video server application program 50-*i*.

Each video that is selected by the above control messages can be retrieved thru the communications module 71 from a remote video library. To selectively access a portion of a video from the library, the video server application program 50-*i* sends a request message on the I/O bus 10*d* to the communications module 71; and that request message is then sent over the communications link 71 to the remote video library.

In response to the request message, the video library sends the requested video data in a predetermined format to the communications module 71 which in turn sends the video data into data buffer 51 within the video server application program 50-*i*. Then, the video data in the buffer 51 is changed as desired, by the video server application program 50-*i*, to another format that is tailored for distribution by the network interface circuit 80 to selectable viewing devices on the network 90.

After the video data in buffer 51 has been put in the proper format, that video data is moved from buffer 51 to the discs 20*c*. This moving of the video data to the discs 20*c* is performed by the video server application program 50-*i* by calling one of the input/output driver programs which is for the discs. Then, the sequence of—a) sending a request message to the video library, b) receiving the requested video data in buffer 51, c) reformatting the received video data, and d) storing the result on the discs 20*c*, is repeated until the entire video is stored on the discs 20*c*.

Consider now how a video is sent to a particular viewing device on the network 90 as a disc-based video stream. Before a disk-based video stream can be sent, the video server application program 50-*i* must first set-up a respective buffer in the hidden memory section 30*b* for that stream. Then, the video data in the disc-based video stream passes from the disk 20*c*, thru buffer 54, and into the respective buffer in the hidden memory section 30*b*. From the respective buffer, the video data passes through the network interface circuit 80 to a particular viewing device on the network 90.

Figure 2:
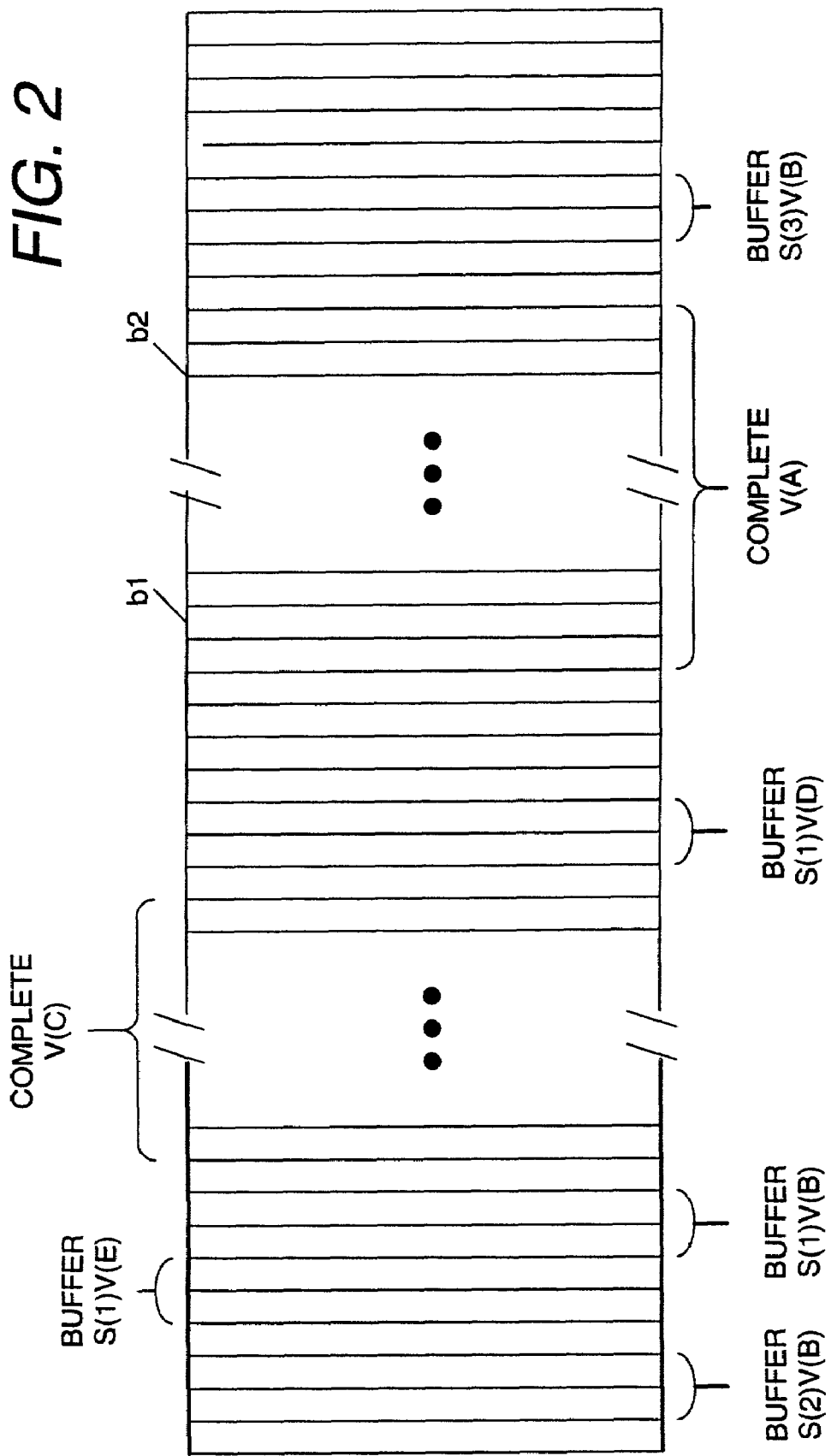
FIG. 2 shows one example of several respective buffers and complete videos that are stored in the semiconductor memory of the video-on-demand system of FIG. 1.

Some examples of the above respective buffers in the hidden memory section 30*b* are shown in FIG. 2. In that figure, buffer S(1)V(B) is used for stream #1 of video B; buffer S(2)V(B) is used for stream #2 of video B; and, buffer S(3) V(B) is used for stream #3 of video B. Similarly, buffer S(1)V(D) is used for stream #1 of video D; and, buffer S(1) V(E) is used for stream #1 of video E.

By comparison, when a video is sent to a particular viewing device on the network 90 as a memory-based video stream, no respective buffer is provided in the hidden memory section 30*b* for that stream. Instead, the video server application program first copies the entire video from the disc 20*c* into the hidden memory section 30*b*. Then the network interface circuit 80 reads video data, as needed, from the complete video in the hidden memory section 30*b*; and, passes the video data that it reads to particular viewing devices on the network 90. In FIG. 2, video A and video C are stored in their entirety in the hidden memory section 30*b*, and they can each be used in multiple memory-based video streams.

To keep track of where the video data is stored in the hidden memory section 30*b*, the video server application program 50-*i* generates a hidden memory map 52. This map 52 divides the hidden memory section 30*b* into a plurality of blocks 30*b*-1 thru 30*b*-*n*. A block of video data from buffer 54 can be stored by the video server application program 50-*i* in any one of the hidden memory blocks 30*b*-1 thru 30*b*-*n*.

For each video which is stored in its entirety in the hidden memory section 30*b*, the hidden memory map 52 correlates the blocks of the video, in their consecutive order for transmission to the network interface circuit 80, to the respective starting addresses of the blocks in the hidden memory section 30*b*. For example, in FIG. 2, the first block of the video V(A) could be block b1; the next consecutive block of the video V(A) could be block b2; etc.

By comparison for each disc-based video stream, the hidden memory map 52 identifies the starting address of the respective buffer in the hidden memory section 30*b* which is used by that video stream. Each such buffer, as shown in FIG. 2, is divided into two halves; and, each half stores one block of video data.

The video server application program 50-*i* keeps track of each half of each hidden memory buffer that is currently being used to pass video data in a disc-based video stream. While one half of the hidden memory buffer is passing video data, the video server application program 50-*i* fills the other half of the buffer with the block of video data that will be passed next in the disc-based video stream.

To store any one block of video data in the hidden memory section 30*b*, the video server application program 50-*i* first uses an input/output driver program to read the block of the video from the disc 20*c* into buffer 54. Thereafter, the video server application program 50-*i* uses the hidden memory driver 60-*j* to move the video data from buffer 54 into a selected block of the hidden memory section 30*b*.

From the hidden memory section 30*b*, the video data is read by the network interface circuit 80 and sent to viewing devices on the network 90. This network interface circuit 80 includes components 81-86. Component 81 is a supervisor processor which has a memory 82. Component 83 is a co-processor which has a scheduler circuit 84 and a control memory 85. Component 86 is a transmitter that connects the co-processor 83 to the network 90 of respective display devices for multiple clients.

Within the memory 82, a pair of data buffers 82*a* and 82*b* is provided for each disc-based video stream, and for each memory-based video stream. Initially, the supervisor processor 81 fills both of the data buffers 82a and 82b with video data from the hidden memory 30b. Thereafter, the co-processor 83 starts sending video data from the data buffer 82a to the network 90 in spaced-apart time slots. When all of the data in the data buffer 82a has been sent, the co-processor 83 starts sending video data from the data buffer 82b; and at the same time, the supervisor processor 81 fills data buffer 82a with the video data, from the hidden memory section 30b, that will be sent next. This process of sending video data from one data buffer 82a or 82b while filling the other data buffer with video data that will be sent next continues over and over until the video server application program 50-i sends a command to stop the process to the supervisor processor 81.

To initially fill both of the data buffers 82a and 82b with video data, the video server application program 50-i must first receive a control message, from a viewer via the communication module 70, such as a command to START a particular movie. In response, the video server application program 50-i examines the hidden memory map 52 to thereby obtain the appropriate beginning address of the video data in the hidden memory 30b, and it sends that beginning address to the supervisor processor 81. Thereafter, the supervisor processor 81 uses the beginning address that it was sent to fill the data buffers 82a and 82b with the video data from the hidden memory.

Preferably, the total number of bytes in each block of the hidden memory 30b is an integer "n" times the total number of bytes in each of the data buffers 82a and 82b. One practical range for the integer "n" is from ten to one-thousand. For any given integer "n", the supervisor processor 81 will fill the data buffers 82a and 82b a total of "n" times before it needs the beginning address of the next block of video data in the hidden memory section 30b.

When all of the video data in one block of the hidden memory 30b has been sent to the data buffers 82a and 82b, the supervisor processor 81 sends a message on the I/O bus 10d to the video server application program 50-i. This message notifies the video server application program 50-i that the above event occurred. In response, the video server application program 50-i examines the hidden memory map 52 and thereby determines which block in the hidden memory section 30b stores the video data that should be sent next. Then, the beginning address of the next block is sent by the video server application program 50-i to the supervisor processor 81. Thereafter, the supervisor processor 81 uses the address that it received to transfer the next block of video data directly from the hidden memory section 30b into the data buffers 82a and 82b as was described above.

From the data buffers 82a and 82b, video data is transferred by the co-processor 83 to selected viewing devices on the network 90 in a time-shared fashion as follows. For each particular client who has requested to see a video, the scheduler circuit 84 allocates certain time-slots on the network 90. Then, when a time-slot for a particular client occurs, the co-processor 83 reads a predetermined number of bytes of video data from one of the data 82a or 82b buffers in the memory 82. Then, that video data is sent on the network 90 to the viewing device for the client.

Up to this point, the Detailed Description has described how the video-on-demand system of FIG. 1 sends disc-based video streams and memory-based video streams to respective viewing devices for multiple clients on the network 90. Now, the description will turn to how all of the disc-based video streams of one particular video are seamlessly replaced with corresponding memory-based video streams; and how all memory-based video streams are seamlessly replaced with corresponding disc-based video streams.

To begin this portion of the description, reference should be made to FIG. 3A. There, at time T1, a client C(1) sends a request on the communication channel 70a to view of particular video V(Y). Then, in response at time T2, the video server application program 50-i initiates a disc-based video stream S(1)V(Y). This stream is sent to a viewing device on the network 90 for the client C(1).

Next, at time T3 in FIG. 3A, another client C(2) sends a request on the communication channel 70a to view the particular video V(Y). Then, in response at time T4, the video server application program 50-i initiates a disc-based video stream S(2)V(Y). This stream is sent to a viewing device on the network 90 for the client C(2).

Thereafter, several additional clients each send a request on the communications channel 70a to view the video V(Y). For each such request, the video server application program 50-i initiates another disc-based video stream. In FIG. 3A, the request by client C(N) occurs at time T5; and in response, the disc-based video stream S(N)V(Y) for client C(N) is initiated at time T6.

Each time a new disc-based video stream is started for the video V(Y), the video server application program 50-i makes a determination as to whether or not all of the disc-based video streams for the video v(Y) should be replaced with corresponding memory-based video streams. This determination is made by evaluating a predetermined criteria, such as is the video server application program 50-i spending too much time transferring the video V(Y) from the discs 20c to the respective buffers for each stream in the hidden memory section 30b.

When the video server application program 50-i decides that it is time to replace all of the disc-based video streams for video V(Y) with corresponding memory-based video streams, the video server program 50-i starts to copy the entire video V(Y) from the discs 20c into the hidden memory section 30b. In FIG. 3A, this copying starts at time T7 and it finishes at time T15.

While the complete video V(Y) is being copied into the hidden memory sections 30b, the swap control program 53 monitors each of the disc-based streams S(1)V(Y) thru S(N)V(Y). And, after at least two blocks of video data beyond that which is currently being sent in the i-th disc-based video stream S(i)V(Y) has been copied as part of the complete video in the hidden memory, the swap control program 53 sequentially switches the i-th disc-based stream first to a mixed video stream and then to a memory-based stream. Here, "i" is each of the integers 1, 2, . . . N.

For example, in FIG. 3A, the disc-based video stream S(N)V(Y) is switched to a mixed video stream at time T8; and later at time T10, that mixed video stream is switched to a memory-based video stream. Similarly, the disc-based video stream S(2)V(Y) is switched to a mixed video stream at time T9; and later at time T13, that mixed video stream is switched to a memory-based video stream. Likewise, the disc-based video stream S(1)V(Y) is switched to a mixed video stream at time T11; and later at time T14, that mixed video stream is switched to a memory-based video stream.

During each disc-based video stream, the video V(Y) is sent in blocks from the discs 20c to buffer 54, then from buffer 54 to the respective buffer in the hidden memory 30b, and then from the respective buffer in the hidden memory 30b thru the network interface circuit 80 to the viewer network 90. By comparison, in each mixed video stream, the video V(Y) is not sent into the respective buffer in the hidden memory 30b; but, the video V(Y) continues to be sent from the respective buffer in the hidden memory 30b thru the network interface circuit 80 to the viewer network 90. Later, in each memory-based video stream, the video V(Y) is sent from the complete video in the hidden memory 30b thru the network interface circuit 80 without the use of a respective buffer in the hidden memory 30b.

While the video V(Y) is being copied from the discs 20c into the hidden memory 30b, another client C(N+1) can also send a request on the communication channel 70a to view the video V(Y). In FIG. 3A, this is illustrated as occurring at time T12.

In response to the above request at time T12, the video server application program 50-i checks to see if at least two blocks of the video V(Y) have been loaded into the hidden memory 30b beyond the starting point for the client C(N+1). If they have, then the video server application program 50-i initiates a memory-based video stream for the client C(N+1). Otherwise, the video server application program 50-i initiates a disc-based video stream for the client C(N+1). Thereafter, the swap control program 53 sequentially switches that disc-based video stream first to a mixed video stream and then to a memory-based video stream.

Suppose now that at time T5 in FIG. 3A, the hidden memory 30b is storing so many other complete videos that there is no room left in which the video V(Y) can be copied. In that case, between time T6 and time T7 in FIG. 3A, the following events occur.

First, the video server application program 50-i identifies one particular video V(Z) that is stored in the hidden memory 30b but which has substantially fewer viewers than the video V(Y). Then the swap control program 53 seamlessly replaces each memory-based video stream for the video Y(Z) with a corresponding disc-based video stream. Then the sequence from time T7 to time T15 in FIG. 3A occurs with the video V(Y) being copied into the hidden memory 30b over the video Y(Z).

The above sequence of events is illustrated in FIG. 3B. There, at time T5, the client C(N) sends a request to view the video V(Y); and also at that time, five memory-based streams of video V(Z) are being sent. These are streams S(1)V(Z), S(2)V(Z), . . . S(5)V(Z).

In response to the request at time T5, the video server application program 50-i initiates the disc-based video stream S(N)(V(Y) at time T6. Then, between time T6 and time T7, the swap control program 53 seamlessly replaces each memory-based stream of the video Y(z) with a corresponding disc-based video stream. To do that, the swap control program 53 sequentially switches the i-th memory-based stream first to a mixed video stream and then to a disc-based stream. Here, "i" is each of the integers 1, 2, . . . 5.

For example, in FIG. 3B, the memory-based video stream S(2)v(Z) is switched to a mixed video stream at time T6A; and later, at time T6D, that mixed video stream is switched to a disc-based video stream. Similarly, the memory-based video stream S(5)V(Z) is switched to a mixed video stream at time T6B; and later at time T6E, that mixed video stream is switched to a disc-based video stream. Likewise, the memory-based video stream S(1)V(Z) is switched to a mixed video stream at time T6C; and later at time T6F, that mixed video stream is switched to a disc-based video stream.

During each memory-based stream of the video V(Z), video data is sent from the complete video V(Z) in the hidden memory 30b thru the network interface circuit 80. By comparison, during each mixed stream of the video V(Z), video data is sent from the complete video V(Z) in the hidden memory 30b into a respective buffer for each stream in the hidden memory 30b; and at the same time, video data continues to be sent from the complete video V(Z) in the hidden memory 30b thru the network interface circuit 80. Further by comparison, during each disc-based stream of the video v(z), video data is sent in blocks from the discs 20c to buffer 54, then from buffer 54 to the respective buffer in the hidden memory 30b, and then from the respective buffer in the hidden memory 30b thru the network interface circuit 80.

Next, with reference to FIGS. 4-8, one preferred embodiment of the video server application program 50-i will be described. This embodiment directs the computer 10 to perform all of the steps S1, S2, etc., which the FIGS. 4-8 illustrate.

Figure 4:
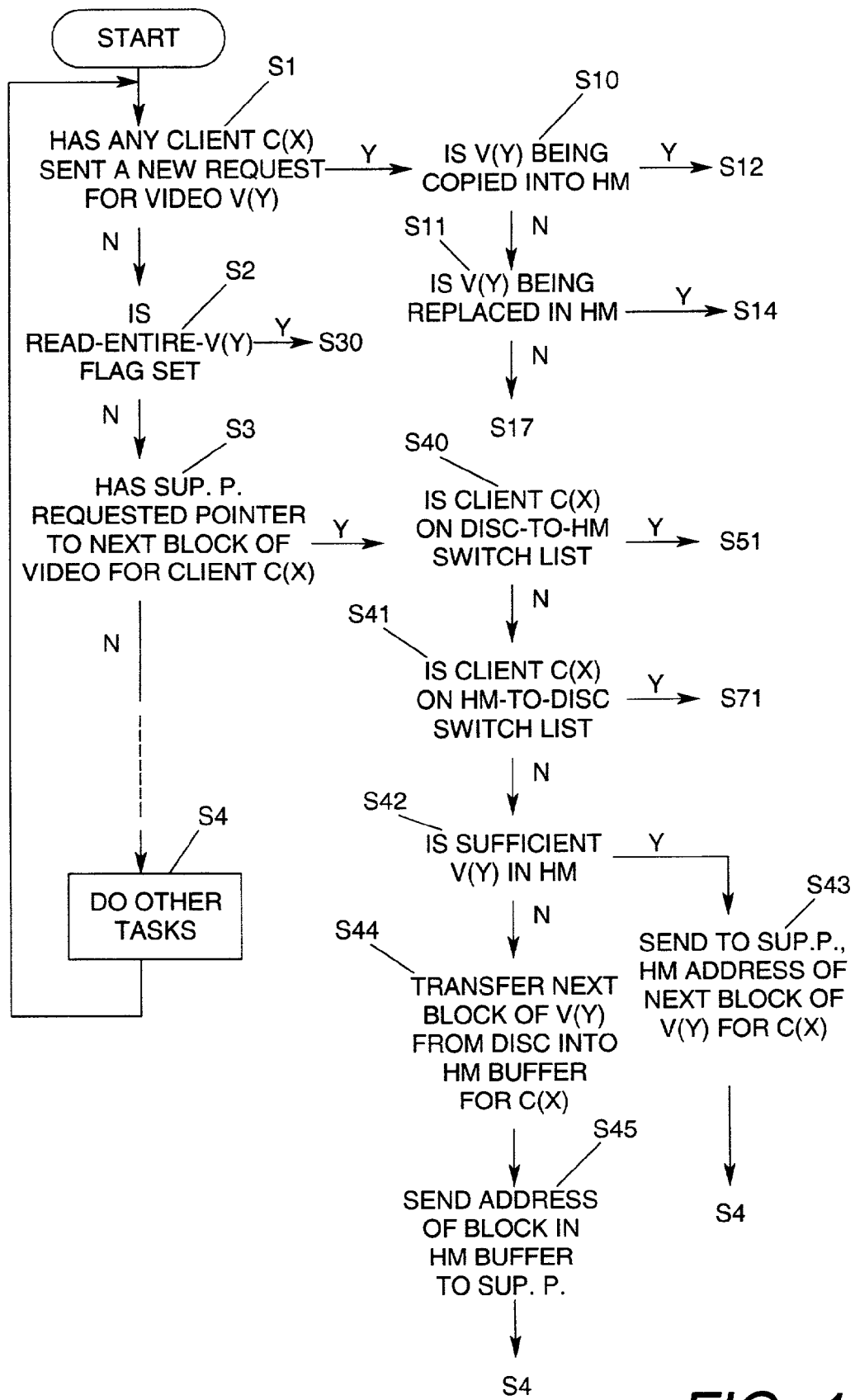
FIG. 4 shows one portion of a video server application program which is in the video-on-demand system of FIG. 1 and which performs the switching sequence of FIGS. 3A and 3B.
Figure 5:
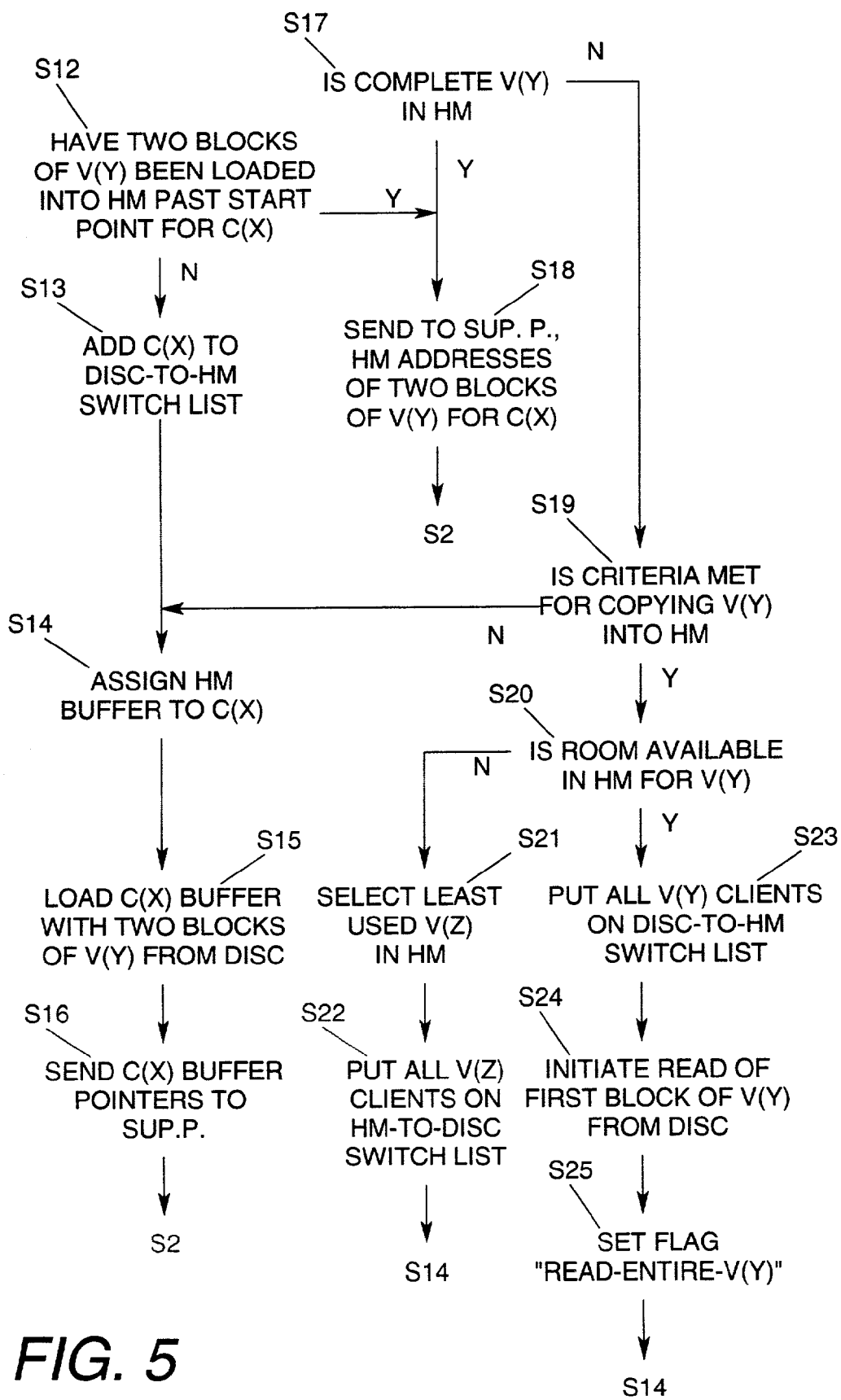
FIG. 5 shows a second portion of the video server application program of FIG. 4.

To begin, steps S1-S4 in FIG. 4 constitute a main control loop that is repeated over and over. In step S1, a test is made to determine if any client C(X) has sent a new request, on the communication channel 70a, for the video v(Y). If such a request has been sent, then a branch is taken to step S10; otherwise, step S2 is performed.

In step S10, a test is made to determine if the requested video V(Y) is currently being copied from the discs 20c into the hidden memory 30b. If that is occurring, then a branch is take to step S12 in FIG. 5. Otherwise, step S11 is performed.

In step S11, a test is made to determine if the requested video V(Y) is being replaced in the hidden memory 30b by another video. If that is occurring, then a branch is take to step S14 in FIG. 5. Otherwise, a branch is take to step S17 in FIG. 5.

Suppose now that branches are taken from step S1 to step S10, then from step S10 to step S11, and then from step S11 to step S17. This occurs if the client C(X) requests a video V(Y) that currently is not being copied into the hidden memory 30b and currently is not being replaced in the hidden memory 30b. In step S17, a test is made to determine if the complete video is already stored in the hidden memory 30b.

If the complete video is in the hidden memory 30b, then the video server application program 50-i performs step S18. There, the supervisor processor 81 is sent the starting addresses of the first two blocks in the hidden memory 30b of the video V(Y) for the client C(X). This initiates a memory-based stream of the video V(Y) for the client C(X). Then, a branch is taken to the main control loop of FIG. 4 at step S2.

Now, suppose that back in step S17, the test determined that the complete video V(Y) is not in the hidden memory 30b. In that case, a branch is taken to step S19.

In step S19, a test is made to determine if the predetermined criteria is met for copying the entire video V(Y) from the discs 20c into the hidden memory 30b. If that criteria is not met, then a branch is taken to step S14. Otherwise, step S20 is performed.

Assume now that the branch is taken from step S19 to step S14. Then, in step S14, the video server application program 50-i assigns a respective buffer in the hidden memory 30b to the client C(X). Next, in step S15, the video server application program 50-i reads the first two blocks of the video V(Y) for the client C(X) from the discs 20c, and it transfers those two blocks into the hidden memory buffer for the client C(X). Next, in step S16, the video server application program 50-i sends, to the supervisor processor 81, the starting address of the two blocks which are in the hidden memory buffer for the client C(X). By these steps S14-S16, a disc-based stream of the video V(Y) is initiated for the client C(X). Then a branch is taken to the main control of FIG. 4 at step S2.

Suppose now that back in step S19, a branch is taken to step S20. Then, in step S20, a test is made to determine if there is enough room available in the hidden memory 30b to store the complete video V(Y). If there is not enough room, then a branch is taken to step S21. Otherwise, step S23 is performed.

Now, assume that the branch is taken from step S20 to step S23. Then, in step 23, the video server application program 50-$i$ generates a "DISC-TO-HM" switch list which identifies all of the clients who currently need to be sent a stream of the video V(Y). Next, in step S24, the video server application program 50-$i$ initiates the read of the first block of the video V(Y) from the discs 20$c$. Next, in step S25, the video server application program 50-$i$ sets a "READ-ENTIRE-V(Y)" flag. Then, a branch is taken to step S14 whereupon steps S14-S16 are performed as previously described.

Suppose now that back in step S20, the branch is taken to step S21. Then, in step S21, the video server application program 50-$i$ selects a video V(Z) which is currently stored in the hidden memory 30$b$ and which currently needs to be sent to substantially fewer clients than the video V(Y). Next, in step S22, the video server application program 50-$i$ generates a "HM-TO-DISC" switch list which identifies all of the clients who currently need to be sent a stream of the video V(Z). Then, a branch is taken to step S14 whereupon steps S14-S16 are performed as previously described.

Next, suppose that branches are taken from step S1 to step S10, then from step S10 to step S11, and then from step S11 to step S14. This occurs if the client C(X) requests a video V(Y) that is currently being replaced in the hidden memory 30$b$. In that case, a disc-based stream of the video V(Y) is initiated for the client C(X). This is done by performing steps S14-S16 as previously described.

Next, suppose that branches are taken from step S1 to step S10, and then from step S10 to step S12. This occurs if the client C(X) requests a video V(Y) that is currently being copied from the discs 20$c$ into the hidden memory 30$b$. Then, in step S12, a test is made to determine if at least two blocks of the video V(Y) have been copied into the hidden memory 30$b$ beyond the point where the video stream for the client C(X) is supposed to start. If that has occurred, then a branch is taken to step S18. Otherwise step S13 is performed. In step S18, a memory-based stream of the video V(Y) is initiated for the client C(X) as was previously described. By comparison, in step S13, the client C(X) is added to the "DISC-TO-HM" switch list; and then, a disc-based video stream is initiated for the client C(X) by steps S14-S16 as was previously described.

Now, consider step S2 of the main control loop in FIG. 4. There, the state of the flag "READ-ENTIRE-V(Y)" is tested. That flag is set by step S25 of FIG. 5, as previously described; and that flag is reset by another step S35 of FIG. 6 which will be described shortly.

Figure 6:
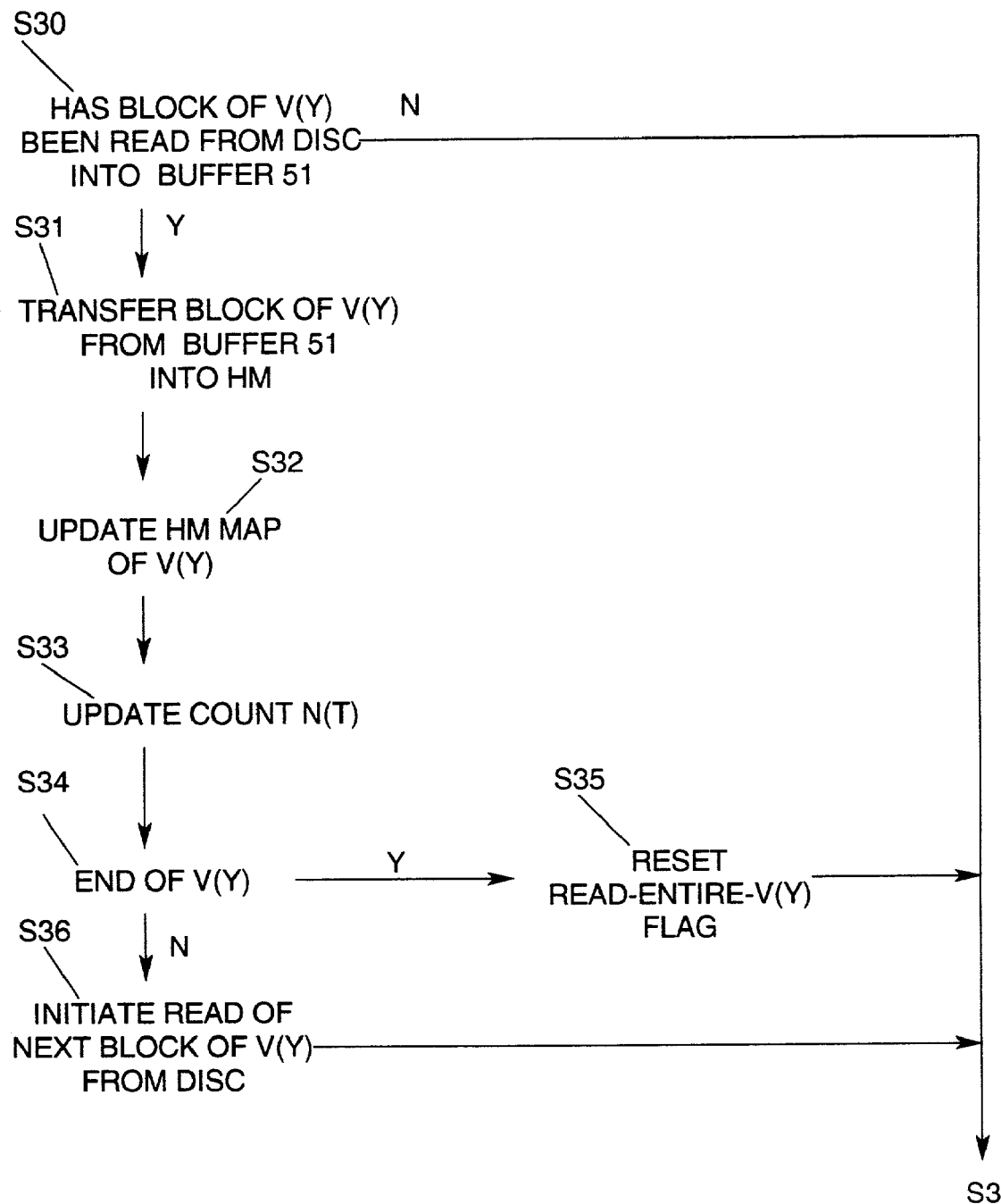
FIG. 6 shows a third portion of the video server application program of FIG. 4.

If the test in step S2 finds that the "READ-ENTIRE-V(Y)" is set, then a branch is taken to step S30 of FIG. 6. There, a test is made to determine if any block of the video V(Y) has been read from the discs 20$c$ and put into buffer 51. A read of the first block was initiated back in step S24 of FIG. 5. If any one block of the video V(Y) has been read from the discs 20$c$ into buffer 51, then step S31 is performed. Otherwise, a branch is taken back to the main control loop at step S3.

In step S31, the video server application program 50-$i$ transfers the block of the video V(Y) from buffer 51 into the hidden memory 30$b$. Next, in step S32, the video server application program 50-$i$ updates the hidden memory map 52 which correlates the blocks of the video V(Y), in their consecutive order for transmission to the network interface circuit 80, to the respective starting addresses of the blocks in the hidden memory 30$b$.

Next, in step S33, the video server application program 50-$i$ updates a count "N(T)". This count equals the total number of blocks of the video V(Y) that have transferred from the discs 20$c$ into the hidden memory 30$b$.

Next, in step S34, a test is made to determine if the entire video V(Y) has been transferred from the discs 20$c$ into the hidden memory 30$b$. If it has, then step S35 is performed. Otherwise, a branch is taken to step S36.

In step S35, the video server application program 50-$i$ resets the flag "READ-ENTIRE-V(Y)"; and then, a branch is taken back to the main control loop at step S3. By comparison, in step S36, the video server application program 50-$i$ initiates a read from the discs 20$c$ of the next consecutive block of the video V(Y); and then, a branch is taken back to the main control loop at step S3.

Now, consider step S3 of the main control loop. There, a test is made to determine if the supervisor processor 81 has requested the starting address, in the hidden memory 30$b$, of the next consecutive block of video data for the client C(X). This request is made by the supervisor processor 81 each time one complete block of the video V(Y) has been sent, for the client C(X), from the hidden memory 30$b$ to the network interface circuit 80.

If the test in step S3 finds that the above request has been made, then a branch is take to step S40. There, a test is made to determine if the client C(X) is on the "DISC-TO-HM" switch list. Clients are put on that list by steps S23 and S13 of FIG. 5 as was previously described. If the client C(X) is on the "DISC-TO-HM" switch list, then a branch is taken to the step S51 of FIG. 7. Otherwise, step S41 is performed.

In step S41, a test is made to determine if the client C(X) is on the "HM-TO-DISC" switch list. Clients are put on that list by step S22 of FIG. 5 as was previously described. If the client C(X) is on the "HK-TO-DISC" switch list, then a branch is taken to step S71 of FIG. 8. Otherwise, step S42 is performed.

In step S42, a test is made to determine if a copy of the complete video V(Y) is in the hidden memory 30$b$. If it is, then step S43 is performed. There, the video server application program 50-$i$ sends to the supervisor processor 81, the address in the hidden memory 30$b$ of the next consecutive block of the video V(Y) for the client C(X). Then a branch is taken back to the main control loop at step S4.

If the test in step S42 determines that a copy of the complete video V(Y) is not in the hidden memory 30$b$, then a branch is taken to step S44. There, the video server application program 50-$i$ reads from the discs 20$c$, the next consecutive block of the video V(Y) for the client C(X). Then, that block is transferred into the respective buffer in the hidden memory 30$b$ which is for the client C(X), over the block that was last sent to the network interface circuit 80.

Next, in step S45, the video server application program 50-$i$ sends to the supervisor processor 81, the starting address of the block of video data that was just written into the hidden memory buffer by step S44. Then, a branch is take back to the main control loop at step S4.

Figure 7:
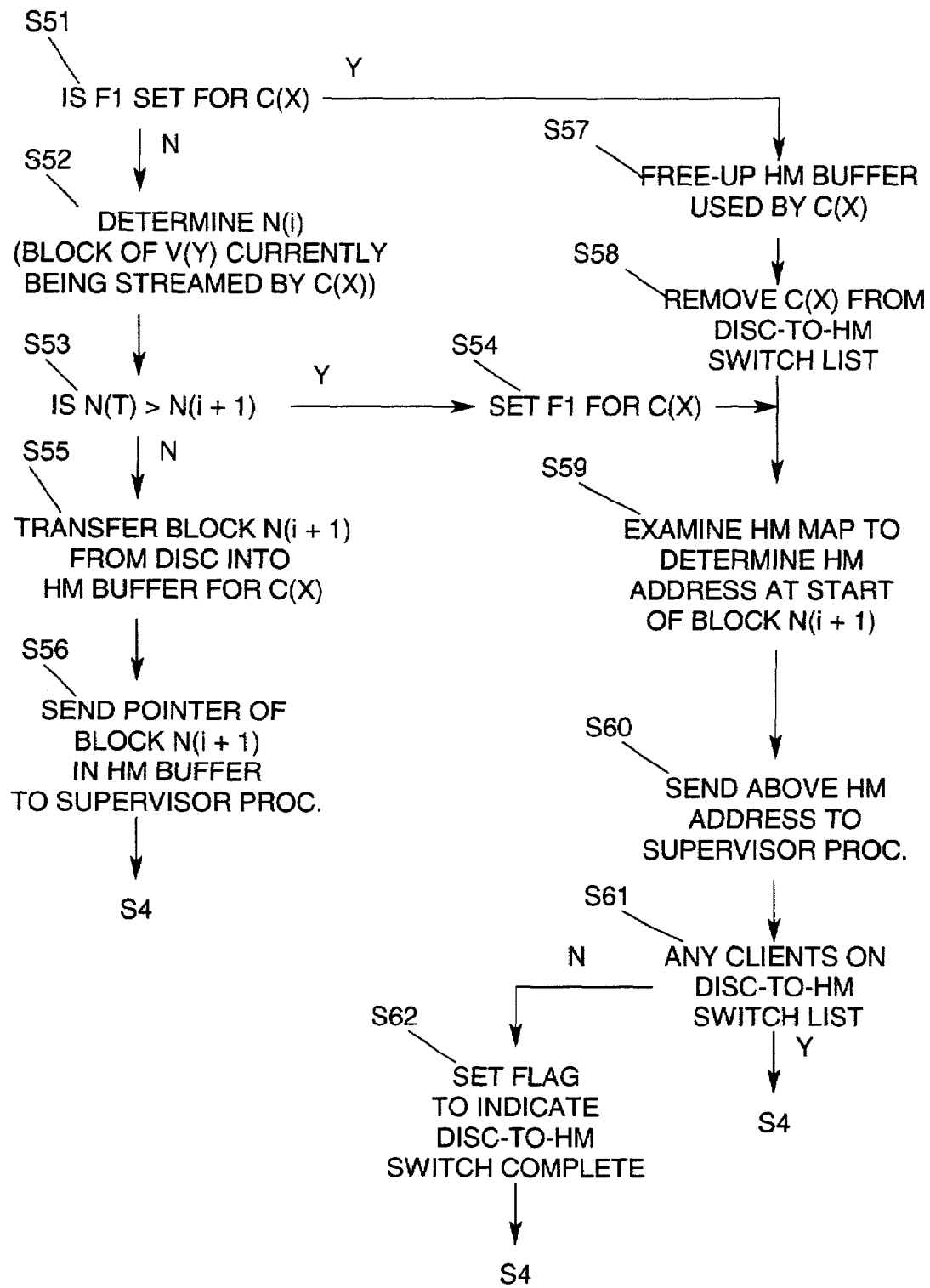
FIG. 7 shows a fourth portion of the video server application program of FIG. 4.

Suppose now that back in step S40 of FIG. 4, the client C(X) is on the "DISC-TO-HM" switch list. If that occurs, then a branch is taken to step S51 of FIG. 7. In FIG. 7, steps S51-S62 are all of the steps in the swap control subprogram 53 that sequentially switch each disc-based stream of the video V(Y) first to a mixed video stream and then to a memory-based video stream. An example of this sequential switching was previously described as occurring from time T8 to time T14 in FIG. 3A.

In step S51 of FIG. 7, the state of a flag "F1" for the client C(X) is tested. One such flag is provided for each client that is on the "DISC-TO-HM" switch list, and the flag is initially reset. Thus, when step S51 is first performed for client C(X), a branch is taken to step S52.

In step S52, an identification is made of the block of the video V(Y) which is currently being streamed from the hidden memory buffer for client C(X) to the network interface circuit 80. This current block of the video V(Y) is herein called block N(i).

Next, in step S53, a test is made to determine if the total number of blocks N(T) of the video V(Y) which have been copied from the discs 20c into the hidden memory 30b extend at least one block past the current block N(i). If they do, then a branch is taken to step S54. Otherwise, step S55 is performed.

In step S55, block N(i+1) of the video V(Y) is read from the discs 20c and transferred into the hidden memory buffer for client C(X). By this transfer, block N(i+1) replaces the block N(i−1) in the hidden memory buffer for client C(X).

Next, in step S56, the supervisor processor 81 is sent the starting address of block N(i+1) in the hidden memory buffer for client C(X). Then, a branch is taken back to the main control loop at step S4.

Suppose now that back in step S53, the test found that N(T) did extend at least one block past the current block N(i). In that case, a branch is taken from step S53 to S54. There, the flag F1 is set for client C(X); and then, a branch is take to step S59.

In step S59, the hidden memory map 52 is examined to determine the starting address, in the hidden memory 30b, of block N(i+1) in the complete video V(Y). Then, in step S60, that starting address is sent to the supervisor processor 81.

By the above steps S54, S59 and S60, the disc-based video stream for client C(X) is switched to a mixed video stream. During this mixed video stream, the current block N(i) of the video V(Y) continues to be sent from the hidden memory buffer for client C(X) to the network interface circuit 80; but, the next consecutive block N(i+1) of the video V(Y) is not sent into hidden memory buffer for client C(X). Instead, the starting address of block N(i+1) from the complete video V(Y) in the hidden memory 30b is sent to the supervisor processor 81.

Next in step S61, a test is made to determine if any clients remain on the "DISC-TO-HM" switch list. Clients are removed from that list by step S58, which will be described shortly. If at least one client remains on the "DISC-TO-HM" switch list, then a branch is taken back to the main control loop at step S4.

Suppose now that back in step S51, the flag F1 is set for client C(X). This flag F1 for client C(X) could only have been set by step S54 during a prior execution of the steps S51, S52, S53, S54, S59 and S60. By that prior execution of steps, a disc-based video stream of the video V(Y) for client C(Y) was switched to a mixed video stream; and now, that mixed video stream needs to be switched to a memory-based video stream. To do that, a branch is taken from step S51 to step S57.

In step S57, the hidden memory buffer which was used to send the disc-based video stream and the mixed video stream for client C(X) is freed-up for use by other clients. Next, step S58 removes client C(X) from the "DISC-TO-HM" switch list. Next, step S59 examines the hidden memory map 52 to determine the starting address of the next consecutive block N(i+1) of the complete video V(Y) in the hidden memory 30b. Then, step S60 sends the above starting address to the supervisor processor 81.

Thereafter, step S61 is performed to determine if any clients remain on the "DISC-TO-HM" switch list. If no clients remain on that switch list, then a branch is taken to step S62. There, a flag is set which indicates that all disc-based streams of the video V(Y) have been seamlessly replaced with corresponding memory-based video streams. This flag is used as desired by the video server application program 50-i. After the flag is set, a branch is taken back to the main control loop at step S4.

Figure 8:
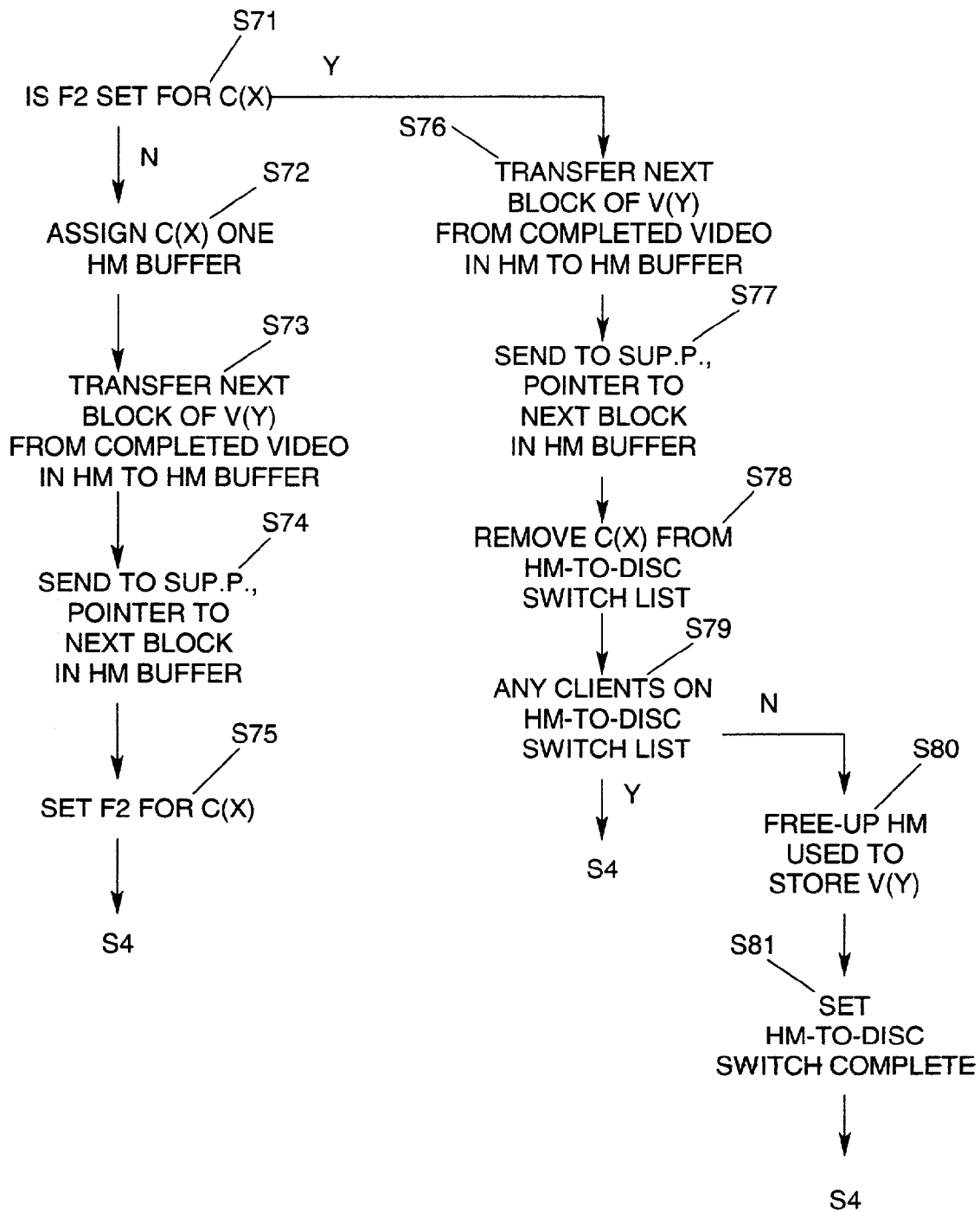
FIG. 8 shows a fifth portion of the video server application program of FIG. 4.

Suppose now that back in step S41 of FIG. 4, the client C(X) is on the "HM-TO-DISC" switch list. If that occurs, then a branch is taken to step S71 of FIG. 8. In FIG. 8, steps S71-S81 are all of the steps in the swap control subprogram 53 that sequentially switch each memory-based stream of the video V(Y) first to a mixed video stream and then to disc-based video stream. An example of this sequential switching was previously described as occurring, for video v(z), from time T6B to time T6F of FIG. 3B.

In step S71 of FIG. 8, the state of a flag "F2" for the client C(X) is tested. One such flag is provided for each client that is on the "HM-TO-DISC" switch list, and the flag is initially reset. Thus when step S71 is first performed for client C(X), a branch is taken to step S72.

In step S72, one respective buffer in the hidden memory 30b is assigned to the client C(X). Then, in step S73, the next consecutive block of video data for the client C(X) is transferred from the complete video v(Y) in the hidden memory 30b into the respective hidden memory buffer that was assigned in step S72. Then in step S74, the beginning address of the above block in the respective hidden memory buffer is sent to the supervisor processor 81. Then in step S75, a branch is taken back to the central control loop at step S4.

By the above steps S72-S75, the memory-based video stream for client C(K) is switched to a mixed video stream. During this mixed video stream, the current block N(i) of video data for client C(K) continues to be sent from the complete copy of the video V(Y) in the hidden memory 30b to the network interface circuit 80; and at the same time, the next consecutive block N(i+1) is sent from the complete copy in the hidden memory 30b to the respective hidden memory buffer for client C(K).

Suppose now that back in step S71, the flag F2 is set for client C(K). This flag F2 for client C(X) could only have been set by step S75 during a prior execution of the steps S71, S72, S73, S74 and S75. By that prior execution of steps, a memory-based video stream of the video V(Y) for client C(X) was switched to a mixed video stream; and now, that mixed video stream needs to be switched to a disc-based video stream. To do that, a branch is taken from step S71 to step S76.

In step S76, the next consecutive block of video data for client C(K) is transferred from the complete video V(Y) in the hidden memory 30b into the respective hidden memory buffer that was assigned in step S72. This transfer is made such that the block which was previously transferred into the hidden memory buffer back in step S73 is not disturbed. Then, in step S77, the supervisor processor 81 is sent the beginning address, in the respective hidden memory buffer for client C(X), of the block of video data that was transferred in step S76. Then, in step S78, the client C(X) is removed from the HM-TO-DISC switch list.

Next in step S79, a test is made to determine if any clients remain on the HM-TO-DISC switch list. If at least one client remains on the list, then a branch is taken back to the main control loop at step S4. Otherwise, step S80 is performed.

In step S80, the portion of the hidden memory 30b which was used to store a complete copy of the video V(Y) is freed-up for storing other items. Then in step S81, a flag is set which indicates that all memory-based streams of the video V(Y) have been seamlessly replaced with corresponding disc-based streams. This flag is used as desired by the video server application program 50-i. After the flag is set, a branch is taken back to the main control loop at step S4.

In step S4 of the main control loop, the video server application program 50-*i* can perform any additional tasks, as desired. No additional tasks are relevant to the present invention; and step S4 merely indicates where additional tasks could be inserted into the main control loop. Thereafter, a branch is taken back to step S1 whereupon all of the previously described steps of FIGS. 4-8 are repeated.

One preferred method which constitutes the present invention has now been described in detail. In addition however, various changes and modifications can be made to the details of this preferred method without departing from the essence of the invention.

For example, in FIG. 2, the respective buffers in the hidden memory 30*b* for the disc-based video streams each hold two blocks of video data. But, as a modification, those buffers can be made to each hold "K" blocks where K is an integer of two or more. With that modification, each mixed video data stream in FIG. 3A will last for a time period during which K–1 blocks of video data are sent from a respective hidden memory buffer to the network interface circuit 80. This is achieved by—a) changing step S54 in FIG. 7 to add one to an initial count of zero for client C(X), and b) testing the count in step S51 for a value of K–1. Similarly, each mixed video data stream in FIG. 3B will last for a time period during which K–1 blocks of video data are sent from the complete video in the hidden memory 30*b* to the respective hidden memory buffer. This is achieved by—a) changing step S75 in FIG. 8 to add one to an initial count of zero for client C(X), and b) testing the count in step S71 for a value of K–1.

Also, as another modification, the preferred embodiment of the system that is shown in FIG. 1 can be simplified by eliminating certain modules which are not directly related to sending video data streams. For example, all of user application programs 50-1 thru 50-X can be eliminated, except for the video server application program 50-*i*. Also, if the above change is made, then the operating system 40 can be eliminated. In that case, the video server application program 50-*i* will assume the task of managing the entire semiconductor memory 30; and thus, the memory 30 will not need to be partitioned into two sections 30*a* and 30*b*.

Further, as another modification, the manner in which the video server application program 50-*i* sends the identity of particular blocks of video data to the network interface circuit 80, can be implemented several different ways. This sending occurs in steps S43 and S45 of FIG. 4, steps S16 and S18 of FIG. 5, steps S56 and S60 of FIG. 7, and steps S74 and S77 of FIG. 8. As one example, each block of video data can be identified by sending to the network interface circuit 80, the binary address of where the block begins in the semiconductor memory 30. Alternatively, each block of video data can be identified by sending to the network interface circuit 80, an offset in kilobytes of where the block begins relative to the start of the hidden memory section 30*b*. Alternatively, each block of video data can be identified by sending to the network interface circuit 80, the difference between the ending address of the block that was identified last in a particular stream and the starting address of the next block. To cover all such alternatives, the server application program 50-*i* simply can send to the network interface circuit 80, a "pointer" to the particular block of video data.

Accordingly, it is to be understood that the scope of the present invention is not limited to just the details of the illustrated preferred embodiment, but is defined by the appended claims.

What is claimed is:

1. A method, for use in a video-on-demand system that comprises–1) a digital computer which is coupled to a semiconductor memory, 2) a disc, coupled to said computer, that stores a video, and 3) a network interface circuit which intercouples said computer to respective viewing devices for multiple clients; said method including the steps of:

sending a separate disc-based video stream to said network interface circuit for every client who requests said video, where said video in each disc-based video stream is sent in blocks from said disc into a respective buffer in said semiconductor memory and is sent therefrom to said network interface circuit;

transferring said video in its entirety from said disc to a single region of said semiconductor memory;

switching every disc-based video stream for said video to a separate mixed video stream, where said video in each mixed video stream is not sent into said respective buffer but continues to be sent therefrom to said network interface circuit; and, switching every mixed video stream for said video to a separate memory-based video stream, where said video in each memory-based video stream is sent in blocks from said single region in said semiconductor memory to said network interface circuit without the use of said respective buffers and without the use of said disc.

2. A method according to claim 1 which further includes the step of starting each of said mixed video streams before said transferring step is complete.

3. A method according to claim 2 which further includes the step completing each of said mixed video streams and starting each of said memory-based video streams before said transferring step is complete.

4. A method according to claim 2 which further includes the steps of receiving a request from an additional client, while said mixed video streams are being sent, to view Said video beginning at a particular starting point; sending a memory-based video stream for said additional client if at the time that said request is received, said video has already been transferred by said transferring step into said semiconductor memory beyond said starting point; and otherwise, sending a disc-based video stream for said additional client.

5. A method according to claim 4 which further includes the steps of switching said disc-based video stream for said additional client to a mixed video stream, and thereafter switching said mixed video stream for said additional client to a memory-based stream.

6. A method according to claim 1 which further includes the step of initiating each of said mixed video streams at a different time which occurs when the respective buffer for the corresponding disc-based video stream finishes sending, to said network interface circuit, any one of said blocks of said video that was sent thereto from said disc.

7. A method according to claim 1 which further includes the step of initiating each of said memory-based video streams at a different time which occurs when the respective buffer for the corresponding mixed video stream finishes sending, to said network interface circuit, every block of said video that was sent thereto from said disc.

8. A method according to claim 1 which further includes the steps of storing N blocks of said video in each of said respective buffers at any one time, where N is an integer larger than one; and, sending just N–1 blocks to said video to said network interface circuit in each mixed video stream.

9. A method according to claim 7 where N is equal to two.

10. A method according to claim 7 where N is more than two.

11. A method according to claim 1 which further includes the steps of sending, for each of said disc-based video streams, a respective first series of pointers from said computer to said network interface circuit; and, following each first series of pointers with a respective second series of pointers; where each first series of pointers identifies blocks of said video in one of said respective buffers that occur in one disc-based video stream and corresponding mixed video stream, and where each second series of pointers identifies blocks of said video in said single region of said semiconductor memory that occur in one memory-based video stream.

12. A method according to claim 1 which further includes the steps of receiving a request from an additional client to view said video while said disc-based video streams are being sent, and in response, examining a predetermined criteria to determine if said step of switching every disc-based video stream to a separate mixed video streams should be initiated.

* * * * *